Dec. 12, 1933.   H. B. ACKERMAN   1,939,330
WATER HEATING AND FLUID PRESSURE REGULATING DEVICE
Filed Sept. 5, 1931
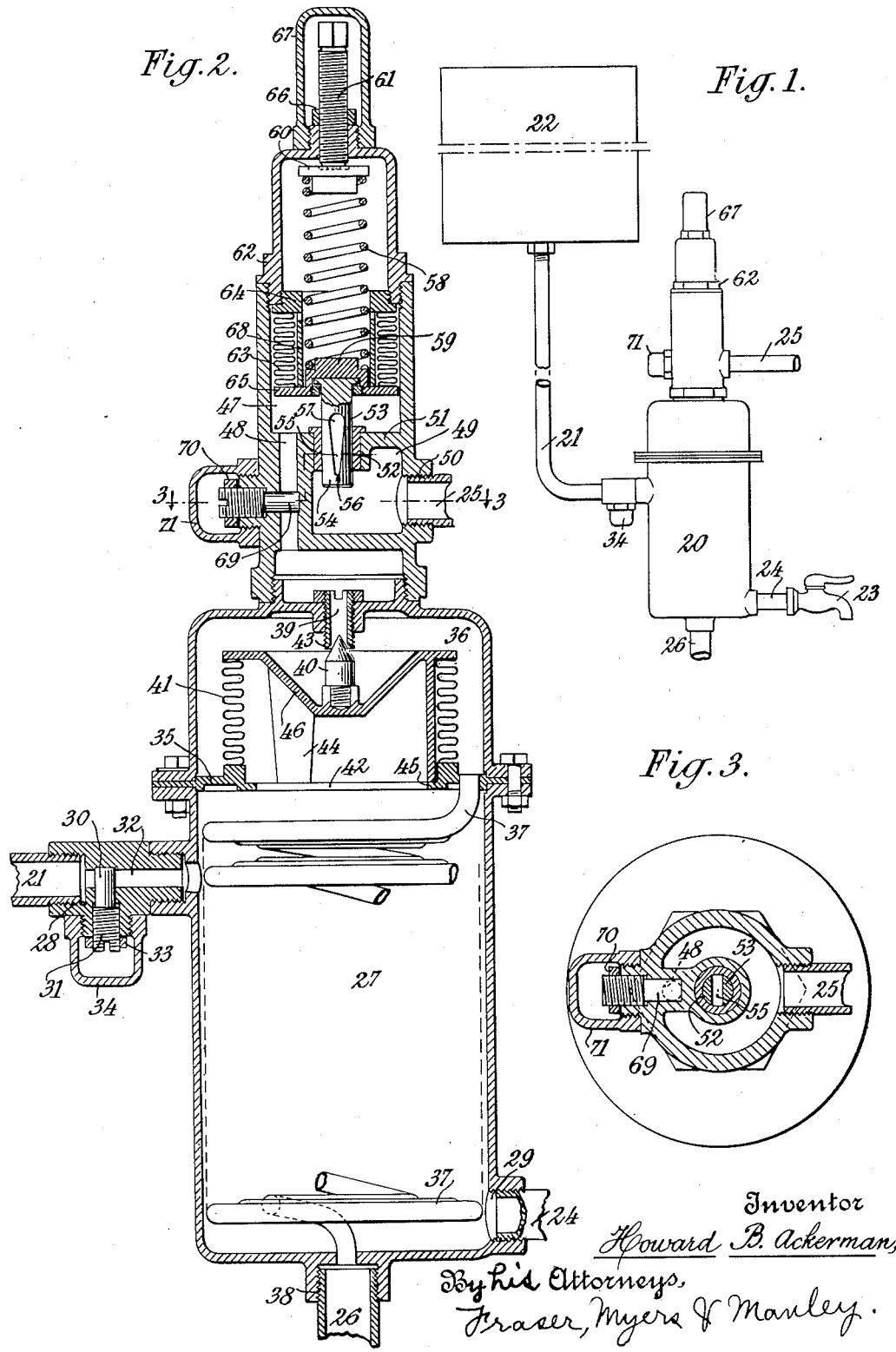
Inventor
Howard B. Ackerman,
By his Attorneys,
Fraser, Myers & Manley.

Patented Dec. 12, 1933

1,939,330

UNITED STATES PATENT OFFICE 1,939,330

WATER HEATING AND FLUID PRESSURE REGULATING DEVICE

Howard B. Ackerman, Brooklyn, N. Y., assignor to Gold Car Heating & Lighting Company, Brooklyn, N. Y., a corporation of New York Application September 5, 1931. Serial No. 561,496

11 Claims. (Cl. 236—25)

This invention relates to improvements in water heating and fluid pressure regulating devices of a character especially adapted to heat water for use in the toilet rooms of Pullman coaches and in situations where similar service is required.

It is one object of the invention to provide a heater of the above-described character comprising means whereby heat energy may be applied to the water only during the periods throughout which it is being drawn from the heating chamber due to the opening of the tap at the wash basin, and means whereby the amount of heat energy transferred to the water during such periods of flow will be in substantial accordance with the amount of water drawn.

In the preferred form of the invention herein disclosed, the initiation and the discontinuance of the flow of the heat-carrying medium are controlled by means responsive to the pressure of water in the water chamber of the heater, whereby the change in pressure due to the withdrawal of water will permit the heating medium to flow, whereas the change in pressure due to the discontinuance of the withdrawal of water will cause the flow of heating medium to be discontinued.

The most satisfactory application of the invention is dependent upon one or more of the following briefly described additional features:—

An adjusting valve may be provided to limit the maximum rate of flow of water from the heating chamber during periods of withdrawal in order that the heater may be adapted to be supplied with water at any desired pressure.

Controlling means may be provided whereby the rate of flow of the heat-carrying agent may be adjusted to conform with the desired temperature of the heated water, and with any desired adjustment of the rate of flow of water through the heating chamber.

The controlling means for the admission of the heat-carrying medium may be in the nature of an equalizing, reducing valve, whereby the rate of flow of the heating agent to its heat-transferring relationship with the water may be maintained constant irrespective of variations of pressure in the source of supply.

The device may be provided with a chamber or reservoir between the admission valve for the heating medium and the location of transfer of heat energy to the water within which the pressure of the heat-carrying medium may be maintained constant.

The means for controlling the flow of heat-carrying medium may comprise two elements, one of which may be adapted to maintain a uniform pressure in the reservoir for the heating agent irrespective of the external pressure and irrespective of the rate of withdrawal from the reservoir, and another adjustable controlling element by means of which the rate of flow from the reservoir to the location of transfer of heat energy may be controlled in accordance with the amount of heat to be imparted to the water during periods of withdrawal and in accordance with adjustments of the rate of flow when such adjusting means is used.

The means for controlling the admission of heat-carrying agent, whether used with or without an additional element for controlling the flow of the heating agent, may itself be adjustable, whereby the amount of heating agent admitted to the heater may be varied in accordance with the desired rate of withdrawal of water from the heater and in accordance with the desired temperature.

If the additional controlling means is used in a heater also provided with means for limiting the rate of flow of water during periods of withdrawal, such rate of flow of water may be adjusted in accordance with the pressure or hydraulic head in the source of supply so as to produce the desired rate of flow during withdrawals, after which the means for controlling the rate of flow of heating agent from its reservoir to the location of transfer of heat energy may be adjusted to permit the needed rate of flow at the desired pressure in the reservoir to impart the desired temperature to the water, and the means whereby the heating agent is admitted from the external source of supply may be adjusted to produce the desired pressure in the reservoir. After such an adjustment has once been effected, any needed decrease or increase in the amount of heat energy to be imparted to the water, due either to some change of temperature in the source of supply or to a change of desired temperature of the water withdrawn, may be effected by an adjustment of the means which controls the admission of heat energy to the heater. This admission-controlling means may be quickly returned to its original setting on the restoration of normal conditions or normal requirements.

The means for controlling the admission of the heat-carrying agent to the heater is of a novel construction, including means adapted to maintain a substantially uniform flow of the heating agent to the location of transfer of heat energy throughout any change of pressure in the source of supply likely to be met in service.

In the accompanying drawing illustrating the preferred form of the invention,—

Figure 1 is a small-scale diagrammatic view of a heater embodying the invention connected with a source of water supply and having a tap from which water may be withdrawn.

Fig. 2 is a vertical, sectional view through the heater illustrated in Fig. 1.

Fig. 3 is a horizontal, sectional view of the heater, the section being taken along the plane represented by the line 3—3, Fig. 2, and viewed in the direction indicated by the arrows.

Referring first to Fig. 1 of the drawing, 20 is a conventional representation of the heater connected by piping 21 with a tank or other appropriate source of water supply 22. Water may be drawn from the heater at a tap or other suitably controlled outlet 23 connected with the heater by piping 24. If, as in the preferred form, the heater is supplied with heat energy by means of steam, hot water, or other fluid carrier of heat energy, such fluid may be supplied to the heater by means of piping 25, and water of condensation or discharged water may be drained away or exhausted from the heater at the drip-outlet 26.

Referring now to Figs. 2 and 3, the heater 20 may comprise a water chamber 27 having an admission orifice 28 for connection with a source of water supply and an outlet orifice 29 for connection with piping leading to the tap or other fixture 23 (Fig. 1).

Unless the heater is always to be connected with a source of supply of constant pressure or head, the means of circulation through the heater should be such as to permit a desired degree of flow when the heater is connected with a source of minimum pressure, and at some point in the circulation, preferably in the connection leading from the admission orifice to the heater, an adjusting valve 30 should be provided whereby the rate of flow of the water may be varied in accordance with the pressure or head of the source of supply with which the heater is used.

The specific form of adjusting valve 30 comprises a screw-plug 31 by means of which the passageway 32 leading from the orifice 28 to the heater may be closed or opened to any desired degree, after which the plug may be held in its adjusted position by a lock-nut 33, and accidental disturbance of the adjustment may be prevented by enclosing the head of the adjusting screw within a screw-cap 34.

If steam is used as the heating agent, the upper portion of the heating chamber 27 may be closed by a partition 35, thereby providing in the upper part of the chamber a space 36 within which may be mounted a pressure-controlled valve for the admission of steam, to be hereinafter described.

As a suitable means of permitting steam to be brought into a relationship with the water in the chamber 27 such that heat energy may be efficiently transferred to the water, the space 36 may be connected by means of a suitable conduit 37 with an outlet 38 in the base of the heater, which may be connected with a drip-pipe 26 from which the water of condensation may be discharged. The conduit or tubing 37 may be in the form of a coil or of any other appropriate form to provide the necessary ratio of heating surface, which should be such as to cause the steam to be entirely condensed during its passage from the chamber 36 to the outlet 38.

The preferred form of means for automatically causing the admission of steam to the coil 37 in accordance with the intermittent flow of water through the heater, as illustrated in Fig. 2, comprises an orifice 39 opening into the steam chamber 36, which may be opened and closed by a valve 40 connected with the partition 35 by means of a diaphragm 41, preferably of the bellows type as shown, which closes an opening 42 in the partition 35. Upward movement of the valve 40 may be limited by the valve seat 43 at the lower end of the orifice 39, and downward movement of the valve may be limited by spaced lugs 44 adapted for engagement with an inturned flange 45 surrounding the opening 42.

It will be apparent that the pressure of water in the chamber 27, when sufficiently great, will lift the diaphragm wall or cap 46 and the valve 40 carried thereby and cause the valve to be firmly held against the seat 43, thus closing the orifice 39. This closure must be effective against the force of gravity acting upon the valve 40 and connected portions of the diaphragm, as well as against the resilient force of the bellows element 41 which normally tends to hold the valve in its depressed position. By suitably adjusting these forces to the water pressure in the chamber 27, the relations may be such as to cause the valve to open whenever the pressure in the water chamber is diminished by the opening of the tap 23 (Fig. 1) and withdrawal of water, and to cause the valve to be closed when the pressure in the water chamber is restored by closing the tap. This may be effected notwithstanding the presence of steam in the steam chamber since the heating coil 37 is intended to be of a capacity such that the required amount of heat energy may be imparted to the water when the outlet 38 is opened to atmosphere, so that the steam fed to the chamber 36 through orifice 39 is substantially at atmospheric pressure. The steam in the chamber 36 will therefore have but a negligible effect in opposing the closing of the valve when the diaphragm is subjected to the normal pressure of the water in the chamber 27 on closing the tap 23 (Fig. 1).

The preferred form of means whereby the heating agent may be fed to the chamber 36 will next be described. This may comprise a steam chamber 47, which, as a matter of convenience, may be hereinafter referred to as a steam reservoir, and the reservoir 47 may be connected by a passageway 48 with the orifice 39 by which steam is admitted to the steam chamber 36. The reservoir 47 is separated from a chamber 49 leading to an inlet orifice 50 by means of a partition 51. The inlet orifice 50 may be connected with any suitable source of steam supply conventionally represented by the piping 25 (Fig. 1), which in a Pullman car installation would be connected with the usual train pipe.

The partition 51, which separates the passageway leading to the orifice 39 from the external source of supply, may be provided with a port 52, and the admission of steam through said port may be controlled by an appropriate valve herein disclosed as a slide valve 53. In the preferred form illustrated, this slide valve comprises a plug 54 having a tapered slot 55 extending therethrough and so positioned that, by moving the plug endwise, one end 56 may be extended beyond the outer wall of the orifice 52 while the opposite end 57 is still in communication with the reservoir 47. When in this position steam entering the orifice 50 may make its way through the slot 55 in the slide valve to the reservoir 47.

If the slide valve is slightly elevated so as to withdraw the end 56 of the slot 55 within the outer margin of the wall of the orifice 52, the communication between the chamber 49 and the reservoir 47 is interrupted and no further steam will be permitted to enter.

In order that steam may be supplied from the reservoir 47 to the steam chamber 36 and heating coil 37 at a uniform rate, irrespective of variations of pressure in the source of supply, the valve 53 may be provided with controlling means of a character such as to make it effective as a reducing valve of the equalizing pressure type, so that steam will be admitted to the reservoir 47 whenever the pressure, due either to condensation in the reservoir and passages or to withdrawals of steam through the orifice 39, falls below a predetermined pressure. Should the entering steam cause the pressure to be increased very slightly above this predetermined pressure, the flow of entering steam will be reduced or discontinued altogether until the normal pressure in the reservoir is restored. And if it is desired that the heater be capable of being operated under different conditions calling for different steam pressures in the reservoir 47, the operating mechanism for the valve 53 may be of an adjustable type, as illustrated.

The preferred form of operating mechanism for the valve 53, herein disclosed, comprises a spring 58 the ends of which may be confined between a head 59 on the upper end of the slide valve 53 and a head 60 which is held by the spring in close contact with the end of an adjusting screw 61 in threaded engagement with the upper end of the valve casing 62.

The upper end of the valve casing, which serves as a housing for the spring 58, may be separated from the reservoir 47 by means of a diaphragm 63, preferably of the bellows type, the upper end of which may be connected with a ring 64 having threaded engagement with the wall of the valve casing, and the lower end of which may be connected with a flange 65 extending outwardly from the head of the valve 53.

In the absence of steam pressure in the reservoir 47, the spring 58 and the weight of the valve and connected parts will balance the opposing resistance of the resilient diaphragm 63 when the valve 53 is in a position such as to cause a portion of the slot 55 to be extended beyond the wall of the orifice 52 into the chamber 49. Steam entering the reservoir 47 will gradually build up the pressure in the reservoir and thus cause the diaphragm to be collapsed and the valve moved upwardly against the opposing effort of the spring to an extent dependent upon the pressure. The particular pressure at which the further admission of steam will be prevented by the withdrawal of the end 56 of the slot in the valve above the outer end of the wall of the orifice may be variably set by means of the adjustment screw 61.

The adjustment screw may be held in any desired position of adjustment by means of the lock-nut 66, and accidental disturbance of the adjustment may be prevented by enclosing the upper end of the adjusting screw and its lock-nut in a screw-cap 67 in threaded engagement with the upper end of the valve casing.

It will be apparent that if the device is set to maintain a constant steam pressure within the reservoir 47 while the pressure in the source of supply communicating with the chamber 49 remains constant although at a higher pressure, any increase in the external pressure would necessarily result in a slightly higher pressure in the reservoir 47, since only as a result of such slightly higher pressure could the valve be held in a position such as to reduce the effective area of the valve opening at the end of the slot 55 and thus prevent the building up of the pressure in the reservoir. This difference of pressure, which need not be great, may be diminished so as to be practically negligible, by suitably apportioning the area of the end of the plug 54 to the area of the diaphragm within the reservoir. Although the area at the end of the plug is relatively small compared with that of the diaphragm, any increase in pressure in the source of supply will aid the diaphragm in lifting the valve against the opposing effort of the spring, so that this increase in pressure alone may be relied upon as a means of preventing the admission of steam due to increases of pressure in the source of supply to an extent such as to materially increase the pressure in the reservoir. The area of the plug may, however, be kept sufficiently small as compared with that of the diaphragm to prevent the inflow of steam from being reduced to an extent such as to permit the pressure in the reservoir 47 to drop materially below its normal predetermined value. The proportions of the valve-controlling means should be such that if the pressure in the reservoir does drop slightly below such value, the reduction of the lifting force due to this lowering of the pressure which is effective on the diaphragm will permit the valve to be slightly opened, notwithstanding the increased pressure against the lower end of the plug 54 due to the increase in the external pressure. By properly adjusting the parts of the mechanism referred to, the pressure in the reservoir 47 may be maintained substantially constant throughout a relatively wide range of variations of the external pressure.

The upward movement of the valve and connected parts may be limited by means of an upwardly-extending cylindrical sleeve 68 adapted to make contact with the lower surface of the ring 64 after the end 56 of the slot 55 in the valve has been withdrawn sufficiently to close the admission orifice provided by the slot and prevent the diaphragm from being abnormally compressed.

If desired, the rate of flow of steam from the reservoir 47 to the coil 37 may be regulated by an adjusting valve which may preferably be located in the passageway 48 connecting the reservoir with the orifice 39. This adjusting valve may comprise a screw-plug 69 by which the passageway 48 may be entirely closed or may be opened to any desired extent, and the plug may be held in any desired position of adjustment by means of a lock-nut 70. Accidental disturbance of the setting of the plug may be prevented by enclosing the exposed portions by means of a threaded cap 71.

When using the water heater as equipped with all of the parts herein referred to in describing the preferred form of the invention, the maximum rate of flow of water through the heater during withdrawals will first be adjusted in accordance with the head available at the admission orifice 28 by properly setting the valve 30, and the flow of steam during periods of withdrawal will be correspondingly adjusted in accordance with the temperature of the water to be heated, the desired temperature of the water to be withdrawn, and the pressure to be maintained in the reservoir 47. This adjustment may be effected by means of the valve 69. The desired pressure in the reservoir 47 which will permit steam to flow through the coil in a quantity sufficient to raise the water to the desired temperature may be effected by a proper setting of the adjusting screw 61.

When the heater has once been adjusted as above explained, and when no water is being withdrawn from the tap 23 (Fig. 1), the pressure in the water chamber will be such as to maintain the valve 40 in close contact with its seat 43 and prevent the admission of steam to the coil 37. So long as no water is drawn from the tap, the steam in the reservoir 47 will be maintained at a predetermined pressure, ten pounds for example, and no further steam will be permitted to enter the reservoir by the slide valve 53 except such small quantities as may be needed to compensate for condensation which takes place in the portions of the heater above the orifice 39. Such water of condensation will drain to the parts of the heater immediately above the orifice and prevent any undue heating of the water in the chamber 27.

If the tap is opened, the reduction of pressure in the water chamber 27 causes the valve 40 to be separated from its seat and permit steam to flow from the reservoir 47 through the orifice 39 to and through the heating coil 37 at a rate determined by the setting of the valve 69. This withdrawal of steam from the reservoir 47 would tend to lower the pressure in the reservoir, thus causing the slide valve 53 to slightly increase the rate of admission and maintain the pressure constant, as already explained. By properly adjusting the valve 69 and the screw 61, the steam in the reservoir 47 may be maintained at a pressure such as to cause just enough to flow through the coil 37 to impart the proper heat energy to the water flowing through the heater as a result of the complete condensation of the steam admitted, after which the water of condensation may be permitted to escape at the outlet 38 or through a drip connection extending from said outlet to any desired point.

For any temporary change in conditions, such, for example, as an increase or decrease in the initial temperature of the water supplied to the heater or an increase or decrease in the desired temperature of the water withdrawn, the desired results may be attained by temporarily modifying the setting of the admission valve 53 by adjusting the screw 61. For any permanent change, such, for example, as an increase in the effective head or pressure of water to be supplied to the heater, it may be preferable to readjust the valve 69 as well as the valve 53 in accordance with the appropriate adjustment of the setting of the valve 30.

Although all parts of the heater herein illustrated and described cooperate with each other to produce the desired results, it is not necessary that all such parts be used under all conditions. The means for controlling the admission of heat energy in accordance with variations of pressure in the water chamber is in no manner dependent upon the particular type of heat energy used. The adjusting valve 30 is of importance only as a means of adapting the heater to work properly, irrespective of the pressure in the source of water supply. The means for controlling the admission of steam need not necessarily be a reducing valve unless the pressure of steam in the source of supply is greater than that which it is desired to use in the heater. And the use of two valves, that is, the reducing valve 53 and the adjusting valve 69 to control the admission of steam to the coil 37, is of importance only when it is desired to effect one setting of the heater for normal conditions and vary that setting to provide for temporary changes of conditions.

The specific type of device herein disclosed is intended to be adapted for use with any appropriate fluid as a carrier of heat energy, although steam is regarded as the most satisfactory heating agent. It will be apparent, therefore, that the invention is not intended to be limited to the specific form of heater herein disclosed for purposes of illustration, but should be regarded as covering modifications and variations thereof within the scope of the appended claims.

What is claimed is:—

1. A water heater comprising a heating chamber, means whereby water may be intermittently admitted to and withdrawn from said chamber, a reservoir for heating fluid, a source from which heating fluid may be supplied to said reservoir, means whereby said heating fluid may be permitted to flow from said reservoir and be brought into a relationship with the water in said chamber such that heat energy may be transmitted from the former to the latter, means whereby the flow of heating fluid from the reservoir may be automatically controlled in substantial accordance with the withdrawal of water from the chamber, and means whereby heating fluid may be admitted to the reservoir from the source of supply in substantial accordance with its withdrawal from the reservoir.

2. A water heater, as defined by claim 1, having an adjusting valve to control the rate of flow of water through the heating chamber during periods of withdrawal.

3. A water heater, as defined by claim 1, of which the means for admitting heating fluid to the reservoir comprises an adjusting valve, whereby the amount of heating fluid supplied during the withdrawal of water may be adjusted in accordance with the amount of heat energy required to impart the desired temperature to the water withdrawn.

4. A water heater, as defined by claim 1, of which the means for admitting heating fluid to the reservoir comprises a pressure-equalizing, reducing valve, whereby the fluid may be supplied at a predetermined, substantially uniform pressure irrespective of variations of pressure in the source of supply.

5. A water heater, as defined by claim 1, of which the means for admitting heating fluid to the reservoir comprises an adjustable, pressure-equalizing, reducing valve, whereby heating fluid may be supplied at various, predetermined, substantially uniform pressures, to conform with the temperature to which it is desired to heat the water, irrespective of variations of pressure in the source of supply.

6. A water heater, as defined by claim 1, having an adjusting valve to control the rate of flow of water through the heating chamber during periods of withdrawal, and of which the means for admitting heating fluid to the reservoir comprises an adjusting valve whereby the rate of flow of heating fluid may be adjusted to conform with any desired adjustment of the rate of flow of water.

7. A water heater, as defined by claim 1, having an adjusting valve to control the rate of flow of water through the heating chamber during periods of withdrawal, and of which the means for admitting heating fluid to the reservoir comprises an adjustable, pressure-equalizing, reducing valve, whereby heating fluid may be supplied at various, predetermined, substantially uniform pressures, to conform with various adjustments of the rate of flow of water.

8. A water heater, as defined by claim 1, having an adjusting valve to control the rate of flow of heating fluid from the reservoir during periods of withdrawal of water, and of which the means for admitting heating fluid to the reservoir comprises a pressure-equalizing, reducing valve, whereby the fluid may be supplied at a predetermined, substantially uniform pressure irrespective of variations of pressure in the source of supply.

9. A water heater, as defined by claim 1, having an adjusting valve to control the rate of flow of heating fluid from the reservoir during periods of withdrawal of water, and of which the means for admitting heating fluid to the reservoir comprises an adjustable, pressure-equalizing, reducing valve, whereby the fluid may be supplied at various, predetermined, substantially uniform pressures to conform with varying rates of flow of heating fluid from the reservoir dependent upon the adjustment of the adjusting valve by which such rate of flow is controlled.

10. A water heater, as defined by claim 1, having an adjusting valve to control the rate of flow of water through the heating chamber during periods of withdrawal and an adjusting valve to control the rate of flow of heating fluid from the reservoir, whereby the latter may be adjusted to conform with any desired adjustment of the former, and of which the means for admitting heating fluid to the reservoir comprises an adjustable, pressure-equalizing, reducing valve, whereby the rate of admission of heating fluid to the reservoir may be adjusted to conform with any desired adjustment of the rate of flow from the reservoir during periods of withdrawal of water and maintained substantially constant, independently of variations of pressure in the source of supply.

11. A water heater comprising a heating chamber, means whereby water may be intermittently admitted to and withdrawn from said chamber, means whereby heat energy may be transmitted to the water as it passes through said chamber, and a device to control the admission of heat energy to said heat-transmitting means, the portion of the heater which separates the water-heating chamber from the heat-controlling device comprising an expansible diaphragm sensitive to variations of water pressure and the heat-controlling device comprising means operated by said diaphragm whereby the change of water pressure due to the withdrawal of water will cause heat energy to be supplied, and the change of pressure due to a discontinuance of the withdrawal of water will cause the supply of heat energy to cease, the entire heater including the water-heating means and the heat-controlling means being constructed as a self-contained unit in a single casing without intermediate pipe connections.

HOWARD B. ACKERMAN.